Figure 1:
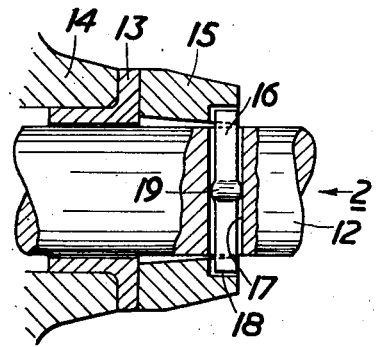

June 18, 1957 J. C. GREY 2,796,305
THRUST BEARINGS
Filed Dec. 7, 1953

INVENTOR
John Constantine Grey
BY Stevens, Davis, Miller & Mosher
his ATTORNEYS

United States Patent Office 2,796,305
Patented June 18, 1957

2,796,305

THRUST BEARINGS

John Constantine Grey, Isleworth, England, assignor of one-half to Power Jets (Research & Development) Limited, London, England, a British company Application December 7, 1953, Serial No. 396,386

Claims priority, application Great Britain December 10, 1952

8 Claims. (Cl. 308—163)

The invention relates to thrust bearings between relatively rotatable shafts and housings therefor and particularly, but not exclusively, to shafts of relatively small diameter and for rotation at very high speeds e. g. of the order of 100,000 R. P. M.

A thrust bearing in which there is direct engagement between two plane bearing surfaces is not suitable for very high rotational speeds, because of the extremely large frictional forces which would be produced at these high speeds. Also, such a bearing would not permit sufficient freedom for relative tilting of the shaft and its housing. Even if the engaging surfaces were curved to permit axial tilting the frictional forces which would be produced at high speeds or with a large axial thrust would be extremely large and would probably produce overheating and seizure of the bearing. For lubrication purposes, grooves or steps are usually provided between two directly engaging bearing surfaces; but when the shaft diameter is small it is very difficult to maintain correct alignment of the two thrust faces and as a result their bearing loads are small and their reliability uncertain. A bearing of the Michell type, in which individual tilting blocks are spaced circumferentially around the bearing, would assist in overcoming these difficulties; but it is not a practical proposition to construct a Michell bearing for small diameter shafts. Therefore it is an object of the invention to provide thrust bearings, especially suitable for shafts of small diameter and rotating at high speeds, which can carry greater loads than similar bearings having directly engaging surfaces and which will produce freedom for relative tilting of the shaft and housing.

According to the invention a thrust bearing between two members, namely a rotatable shaft and a housing therefor, comprises a bearing plate, so secured to one of the two members as to prevent rotation relative thereto, but freely supported for tilting axially thereof, a bearing surface on the plate and a second bearing surface on the said other member for co-operation with the first bearing surface.

One at least of the bearing surfaces may be grooved or stepped in order to permit hydrodynamic lubrication between the surfaces and so to reduce friction, means being provided for supplying lubricant to the cooperating bearing surfaces.

According to one embodiment of the invention, a thrust bearing between a shaft and a housing therefor comprises a bearing plate in the form of a collar fitting freely on the shaft and engaging at one end face a bearing surface on the housing and a key constraining the collar to rotate with the shaft, the key being received within a slot in the other end face of the collar and passing through an aperture extending transversely through the shaft. Preferably the key has a protuberance intermediate in its length for providing a fulcrum about which limited tilting of the shaft relative to the collar may occur. The key may either be in the form of a pin or be blade-shaped.

According to a second embodiment of the invention, the thrust bearing may be modified by providing an end attachment secured to one end of the shaft, the collar then fitting freely around the attachment and the key passing through a transverse throughway therein. The attachment is preferably in the form of a stud or nut screwed to the shaft and secured thereto by locking means. The locking means between the shaft and the stud or nut may comprise wire rods located in axial grooves spaced around the circumference of the stud or nut and extending into corresponding holes in the end face of the shaft, the free ends of the wire rods being bent at right angles so as to be located in diametrically disposed slots in the end face of the stud or nut remote from the shaft. The attachment may have a radially protruding ring intermediate in the length of the portion passing through the collar and engaging the inner wall thereof. The diameter of the ring would only be a few thousandths of an inch (e. g. .003″) smaller than the inside diameter of the collar at that position.

In the above embodiments the bearing face on the housing may be on a non-rotatable bush or cap fitted to the bearing face.

Figure 2:
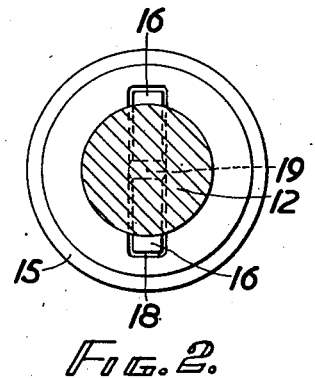
Figure 3:
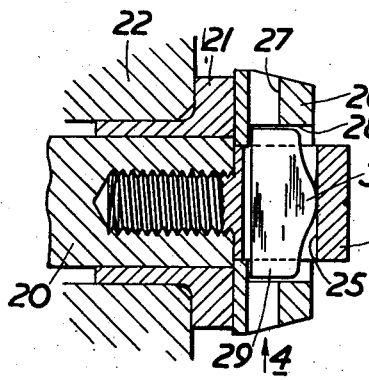
Figure 5:
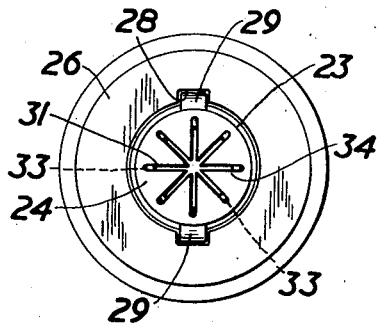
Figure 4:
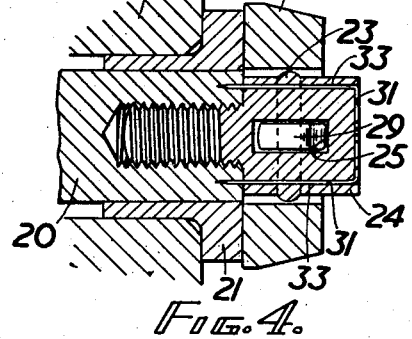

By way of example, the above embodiments will now be described with reference to the accompanying drawings, in which:

Figure 1 is an axial sectional view of the bearing according to the first embodiment, Figure 2 is an end view in the direction of arrow 2 in Figure 1, Figure 3 is an axial sectional view of the bearing according to the second embodiment, Figure 4 is an axial sectional view in the direction of arrow 4 in Figure 3, and Figure 5 is an end view in the direction of arrow 5 in Figure 3.

The first embodiment shown in Figures 1 and 2 comprises a shaft 12 mounted in a bush 13 which is fitted tightly into the housing 14. The shaft is fitted into the bush with a certain amount of freedom to permit tilting of the shaft relatively to the bush. Surrounding the shaft, there is a bearing plate in the form of a loosely fitting collar 15, having a bearing surface engaging another bearing surface on the bush. The two bearing surfaces may be grooved or stepped in order to increase the lubrication. Lubricating means are provided; but these have not been shown. The collar 15 is secured to the shaft for rotation therewith by a pin 16, which is fitted loosely in a throughway 17 in the shaft, with the ends of the pin projecting into a slot 18 in the collar. At the centre of the pin there is an enlarged portion or protuberance 19 which presents a rounded surface for engagement with the wall of the throughway 17. Any tipping of the shaft relatively to the housing will occur at the point of contact of the protuberance 19 and the shaft. In order to assemble or dismantle the bearing, the shaft is withdrawn axially from the housing so as to remove the pin from the slot 18. The pin is then withdrawn from the throughway 17. If the axial loading on the bearing is too large for a pin, a blade-shaped key may be employed instead of a pin.

The second embodiment shown in Figures 3–5 comprises a shaft 20 mounted in a bush 21 fitted tightly in a housing 22. Screwed on to the end of the shaft, there is an end attachment in the form of a stud 24 having a throughway 25. The end attachment could alternatively be in the form of a nut. Bearing on the end face of the bush, there is a bearing plate in the form of a collar 26 also having a throughway 27 and, in its outer face, a slot 28. The collar fits loosely on the stud 24 except at an enlargement 23 in the form of an integral ring intermediate in the length of the head of the stud. The collar is secured for rotation with the stud by a blade-shaped key 29 passing through the throughway in the stud and located at its ends in the slot 28. The key has a rounded protuberance 30 which bears on the wall of the throughway 27. Any tipping of the shaft relatively to the housing will occur at the point of contact of the protuberance 30 and the stud and will occur also about the plane of contact of the enlargement 23 (see Figure 4) with the collar 26. This latter plane of contact is approximately mid-way between the bearing surface between the collar and the bush and the point of contact between the protuberance 30 and the stud. The enlargement 23 prevents eccentricity and wobble in the bearing. To relieve the stress concentration between the key 29 and the bottom of the slot 28 in the collar, the slot is rounded. This may be produced by slotting the collar and then drilling the throughway 27. To assemble the bearing the collar is placed in position on the bush and then the stud with the key already in position in the throughway 25 is screwed on to the shaft and the ends of the key are located in the slot 28. The stud must then be locked to the shaft. This is performed by locating wire rods 31 in circumferentially spaced slots or holes extending axially of the stud-head and inserting the forward ends of the wire rods into holes 33 in the end face of the shaft. The free ends of the wire rods are then bent at right angles into diametrical slots 34. This construction of bearing has an advantage over the first embodiment, viz. the shaft does not have to be moved axially of the housing to assemble or dismantle the bearing.

What I claim is:

1. A thrust bearing comprising housing means, shaft means rotatable in said housing means, a collar surrounding the shaft means, a first bearing surface on one end face of the said collar, a second bearing surface on the housing means and engageable with the said first bearing surface, a first slot in said collar, a second slot in said shaft means, a removable key member within said first and second slots to constrain the collar to rotate with the shaft means and a protuberance on the said key member arranged to abut a wall of said second slot at a position spaced from said bearing surfaces in the axial direction of the shaft means, said protuberance providing a fulcrum for limited tilting of the shaft means relatively to the collar and the housing means.

2. A thrust bearing comprising housing means, shaft means rotatable in said housing means, a collar surrounding the shaft means, a first bearing surface on one end face of the said collar, a second bearing surface on the housing means and engageable with the said first bearing surface, a hole extending transversely through the shaft means, an open slot in the end face of the collar remote from the said first bearing surface, a removable key member within said hole and said slot to constrain the collar to rotate with the shaft means and a protuberance on the said key member arranged to abut a wall of said hole at a position spaced from said bearing surfaces in the axial direction of the shaft means, said protuberance providing a fulcrum for limited tilting of the shaft means relatively to the collar and the housing means.

3. A thrust bearing as claimed in claim 2 in which the key member is a substantially cylindrical pin having the said protuberance intermediate the length thereof.

4. A thrust bearing as claimed in claim 2 in which the key member is blade-shaped with the said protuberance intermediate the length thereof.

5. A thrust bearing comprising housing means, a shaft rotatable in said housing means, an end attachment secured to one end of the said shaft, a collar freely surrounding the said end attachment, a first bearing surface on the end face of the said collar adjacent the said housing means, a second bearing surface on the housing means and engageable with the said first bearing surface, a removable key member passing through a transverse throughway in the said attachment and received at its end in an open slot in the end face of the said collar remote from the said first bearing surface, and a protuberance on the said key member intermediate the length thereof and arranged to abut a wall of said throughway at a position spaced from said bearing surfaces in the axial direction of the shaft means, said protuberance providing a fulcrum for limited tilting of the shaft means relatively to the collar and the housing means.

6. A thrust bearing as claimed in claim 5 in which the said end attachment is a stud screwed to the shaft and in which locking means are operatively positioned between the stud and the shaft.

7. A thrust bearing as claimed in claim 6 in which the locking means comprises wire rods located in axial grooves spaced around the circumference of the stud and extending into corresponding holes in the end face of the shaft, the free ends of the wire rods being bent at right angles so as to be located in diametrically disposed slots in the end face of the stud remote from the shaft.

8. A thrust bearing comprising housing means, a shaft rotatable in said housing means, an end attachment secured to one end of the said shaft, a collar freely surrounding the said end attachment, a first bearing surface on the end face of the said collar adjacent the said housing means, a second bearing surface on the housing means and engageable with the said first bearing surface, a removable key member passing through a transverse throughway in the said attachment and received at its end in an open slot in the end face of the said collar remote from the said first bearing surface, a protuberance on the said key member intermediate the length thereof and arranged to abut a wall of said throughway at a position spaced from said bearing surfaces in the axial direction of the shaft means, said protuberance providing a fulcrum for limited tilting of the shaft means relatively to the collar and the housing means, and a ring protruding radially from the said end attachment intermediate the length of the portion thereof passing through the collar, the said ring engaging the radially inner wall of the collar.

References Cited in the file of this patent

UNITED STATES PATENTS

| | | |
|---|---|---|
| 541,303 | Whitney | June 18, 1895 |
| 1,688,825 | Mills | Oct. 23, 1928 |
| 2,588,126 | Kurtz | Mar. 4, 1952 |